Jan. 13, 1970  J. H. SCHENK  3,488,932
MOBILE NUT GATHERING MACHINE
Filed April 7, 1967  3 Sheets-Sheet 2

INVENTOR.
JOHN H. SCHENK,
BY
Berman, Davidson & Berman
ATTORNEYS.

Jan. 13, 1970  J. H. SCHENK  3,488,932
MOBILE NUT GATHERING MACHINE
Filed April 7, 1967  3 Sheets-Sheet 3

INVENTOR.
JOHN H. SCHENK,
BY
Berman, Davidson & Berman
ATTORNEYS.

United States Patent Office 3,488,932
Patented Jan. 13, 1970

3,488,932
MOBILE NUT GATHERING MACHINE
John H. Schenk, Star Rte., Box 100,
Elberta, Ala. 36530
Filed Apr. 7, 1967, Ser. No. 629,169
Int. Cl. A01g 19/00
U.S. Cl. 56—328                 6 Claims

ABSTRACT OF THE DISCLOSURE

A mobile nut gathering machine including means to advance the machine over the ground, said machine comprising a pair of parallel chains, spaced cross members connecting said chains, a plurality of nut gathering hooks attached to each of said cross members and means to advance the lower pairs of said chains and cross members in the direction of advance of said machine.

This invention relates to self-propelled machines for gathering nuts from the ground.

It is an object of this invention to provide a machine as aforesaid which, while supported at points substantially longitudinally spaced, nevertheless will accommodate variations in contour of the ground between such support points.

It is a further object of this invention to provide in a machine as aforesaid nut gathering mechanisms capable of shallow penetration of the ground so as to insure pick-up of nuts but which nevertheless advance easily through the ground, are self-clearing, and have minimum tendency to pick up trash.

It is a further object of this invention to provide in a machine as aforesaid means for restoring the ground to compact condition following the passage of the previously mentioned nut gathering mechanisms.

It is a further object of this invention to provide in a machine as aforesaid means for discarding trash and soil which may be picked up with the nuts by the nut gathering mechanism The above and other objects will be made clear from the following detailed description taken in connection with the annexed drawings, in which:

FIGURE 1A is a continuation of the left-hand end of FIGURE 1;

Figure 1:
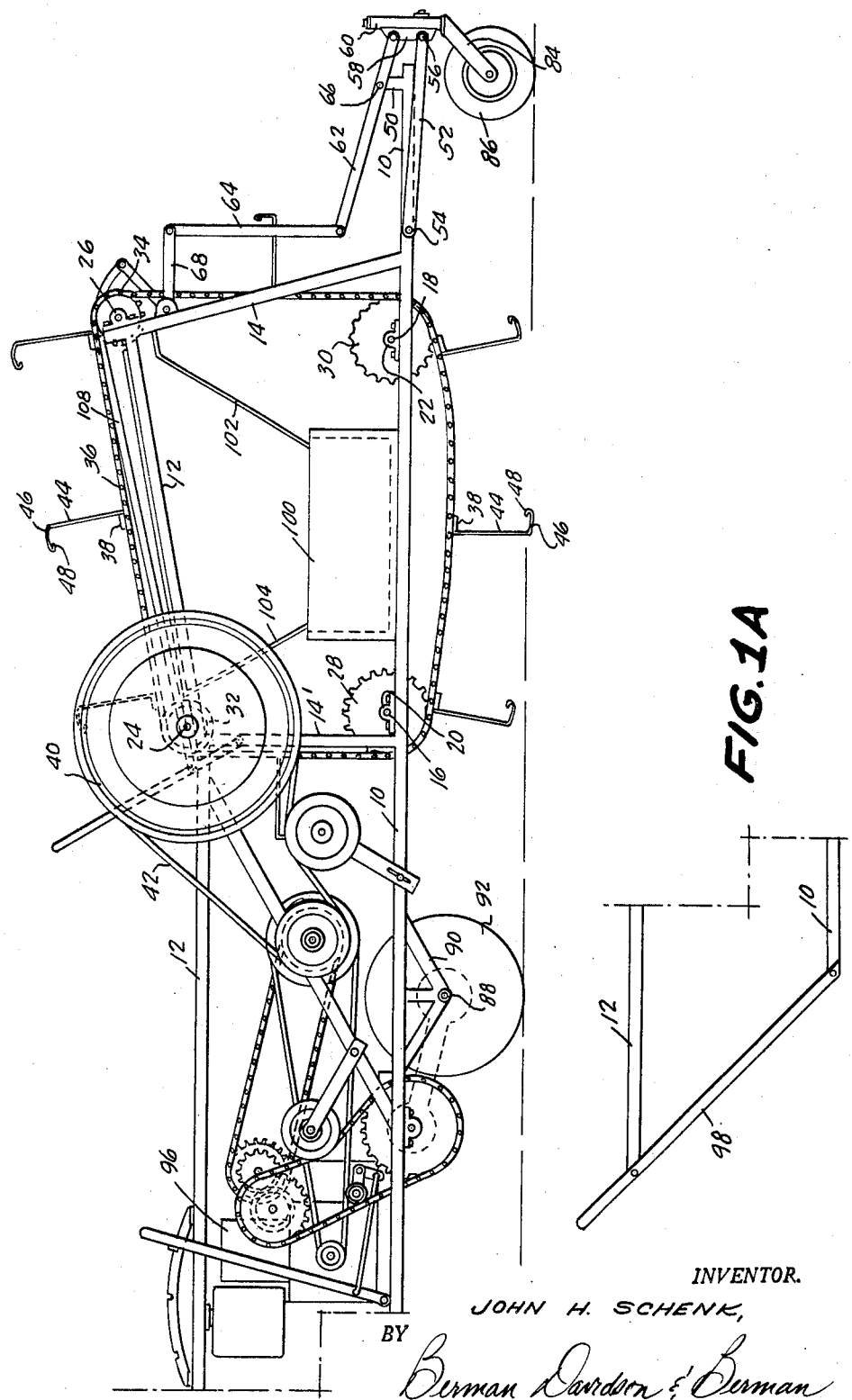
FIGURE 1 is a side elevation of the improved machine.
Figure 2:
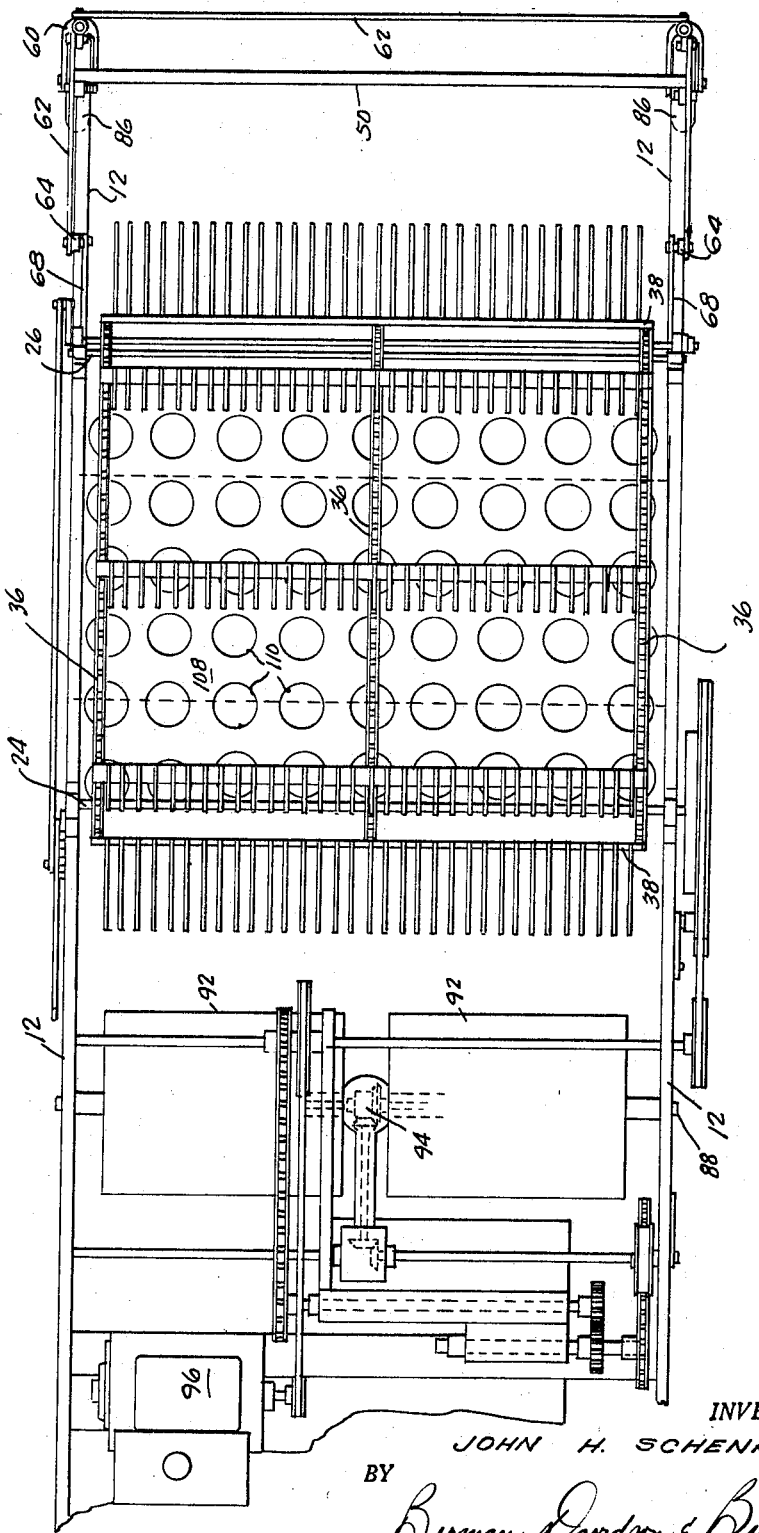
FIGURE 2 is a plan view of FIGURE 1.

Referring now to FIGURES 1, 1A and 2, the machine is made up of lower frame members 10 and upper frame members 12 connected by upstanding members 14 and 14', Transverse shafts 16 and 18 are journaled respectively in bearings 20 and 22 mounted on the lower frame members 10, while transverse shafts 24 and 26 are similarly journaled in bearings attached to the upper frame members 12. Pairs of sprockets 28 and 30 are respectively secured to the shafts 16 and 18 adjacent their respective lower frame members 10 and pairs of sprockets 32 and 34 are secured respectively to shafts 24 and 26 adjacent the upper frame members 12. A pairs of chains 36 run around the set of sprockets just described and carry a series of cross members 38. A pulley 40 is secured to the upper rear cross shaft 24 and is driven by a belt 42 in a counterclockwise direction, as viewed in FIGURE 1.

Depending on the width of the machine and the speed at which it is desired to operate, a third sprocket chain 36 may be placed centrally of the machine with its own set of sprockets and may itself be joined to the cross members 38. Each cross member 38 has secured thereto a plurality of spring steel fingers 44, each terminating in a hook member 46 having its free end bent back as at 48. The members 44 are at right angles to the cross members 38 and the number and spacing of members 44 is determined by the kind and size of nuts to be gathered.

The forward extremities of the lower frame members 10 extend considerably beyond the forward shaft 1 and adjacent their free ends the lower frame members 10 are joined by an upstanding cross-piece 50. Levers 52 have their rear ends pivoted at 54 to the lower frame members 10. The members 52 are pivoted at 56 to a bracket 58 protruding from a bearing member 60. There is, of course, a bracket 58 and a bearing member 60 at each side of the machine and the two bearings 60 are joined by a cross member 62.

Figure 3:
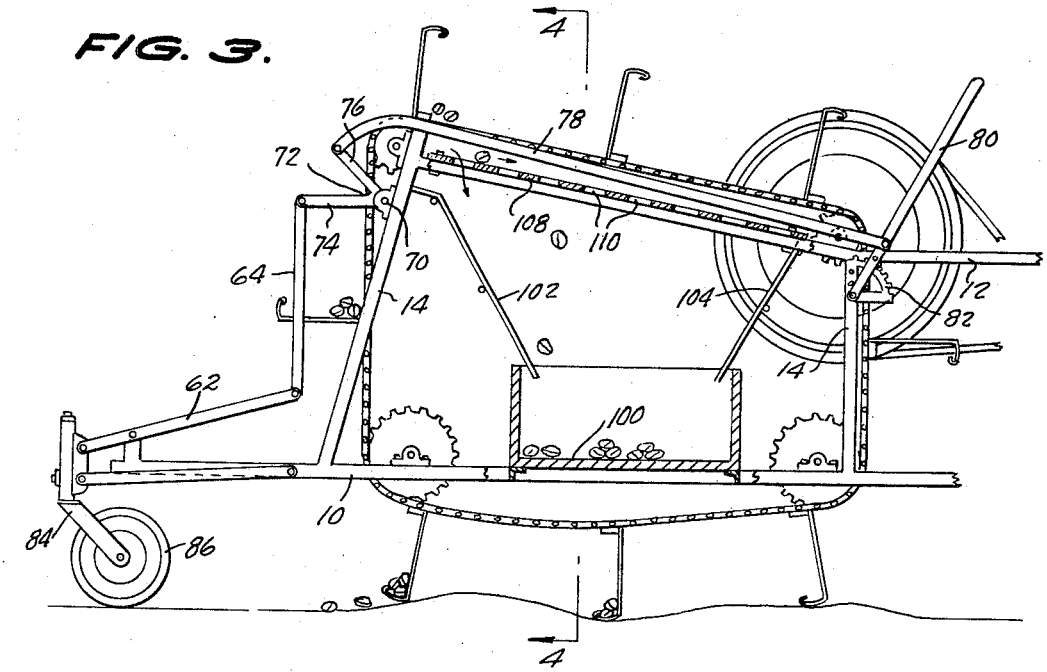
FIGURE 3 is an elevation, partly in section of the opposite side of a portion of FIGURE 1.

On each side of the machine levers 62 each have one free end pivoted to a flange 58, the opposite free end pivoted to an upright strut 64 and are pivoted at an intermediate point 66 to the cross member 50. The upper end of one strut 64 (FIGURE 1) is pivoted to an arm 68, which is keyed to a cross shaft 70. At its opposite end (FIGURE 3) the shaft 70 is keyed to a bell crank 72 and the adjacent strut 64 is pivoted to one arm 74 of the bell crank 72. The other arm 76 of the bell crank 72 is pivoted to a link 78 which has its opposite end pivoted to a lever 80 which in turn in pivoted to the adjacent rear upright member 14. The usual ratchet 82 secures the lever 80 in any desired position of adjustment. When the lever 80 is pulled rearward from its position, as shown in FIGURE 3, it rocks the bell crank 72 and the shaft 70, thus drawing upwardly both of the struts 64, thereby tilting downwardly the levers 62 and depressing the bearings 60.

Each bearing 60 has journaled therein the pintle of a caster 84 which carries a guide wheel 86. Manipulation of the lever 80 therefor raises or lowers the guide wheels 86 relative to the frame members 10 and they thereby control the operating height of the machine as a whole above the ground level.

Referring now to FIGURES 1 and 2, rearwardly of the chain 36 there is a shaft 88 journaled in brackets 90 secured to the lower frame members 10. A pair of rollers 92 are journaled on the shaft 88 and serve the triple purpose of supporting the rear end of the machine, impelling the machine forward and smoothing the ground after passage thereover and therethrough of the hooks 46. The rollers 92 are driven by a differential gear indicated generally at 94 and by conventional braking means (not shown) it may be differentially operated in order to effect the steering of the machine.

A motor 96 is mounted on the machine frame and through a conventional arrangement of belts, chains, pulleys and sprockets, forming no part of the present invention but generally illustrated in FIGURES 1 and 2, drives both rollers 92 and the pulley 40. In FIGURE 1A, it will be seen that lower frame members 10 and upper frame members 12 are secured to an inclined handle member 98.

Figure 4:
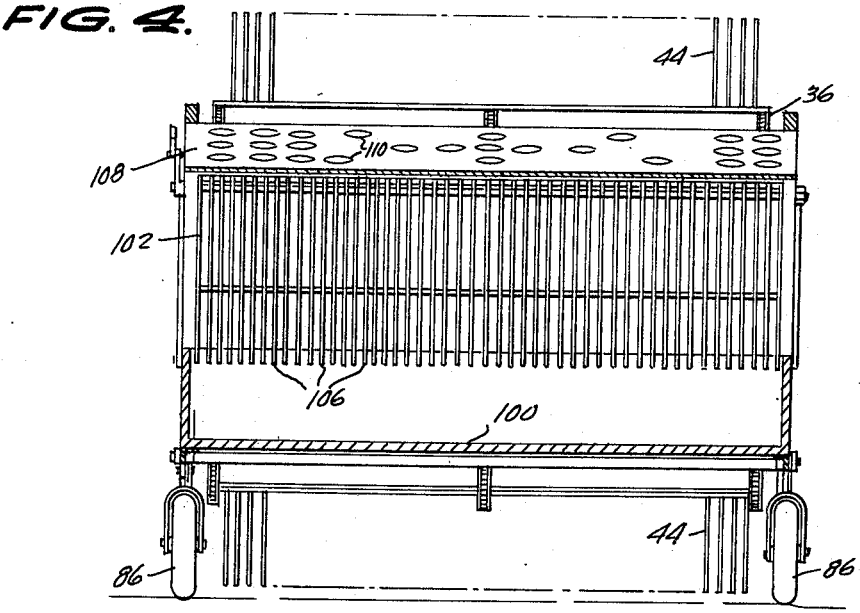
FIGURE 4 is a section on the line 4—4 of FIGURE 3.

A nut collecting box 100, best seen in FIGURES 1 and 3, is secured between the lower frame members 10 and lies entirely within the loop formed by the chains 36. A nut guide 102 is secured to the forward uprights 14 and a similar nut guide 104 is secured to a cross member running between the upper frame members 12 a little ahead of the axle 24. As best shown in FIGURE 4, nut guide 102, as is the case in nut guide 104, is made up of a plurality of spaced fingers 106, preferably of spring steel. The fingers 106 are spaced together closely enough to prevent nuts falling through but nevertheless freely pass soil and fine trash.

Since the upper rear shaft 24 is a driven shaft and the upper pass of the belts 36 moves toward that shaft, this pass of the belts is under tension and maintained substantially straight. The lower pass, however, is provided with considerable slack and, as shown in FIGURE 3, this permits the fingers 44 to accommodate themselves to irregularities in the ground over which they pass. The bent free ends 48 of the hook portions 46 have previously been mentioned. The reason for the bent portion 48 is to prevent, so far as possible, the fingers 44 and the hooks 46 from acting in the manner of a rake to gather trash from the ground. This particular machine is designed primarily for harvesting pecans,, though by no means restricted to that particular use. Pecans, however, are grown in fairly light soil. In the usual care of the orchards, this soil receives a fall planting of a cover crop such as oats, rye or barley. Prior to harvesting time, the crop is mowed and removed from the field, after which the field is subjected to disc harrowing so that by the time the nuts begin to fall to the ground ready for harvest, the soil which is naturally loose in any event is very definitely loose preparatory to nut harvest and most of the trash which otherwise would accumulate in the hooks 46 is underground due to the discing action. This discing preparatory to nut harvest contributes greatly to the ability of the hooks 46 to penetrate the ground to a shallow depth of perhaps half an inch as heretofore mentioned.

Secured between the upper frame members 12 and below the upper paths of the belts 36 is a screen plate 108 having perforations 110 sized to pass freely the largest nuts to be expected. These perforations may be in staggered rows, if desired, or in regular rows, as shown. As best shown in FIGURE 3, the plate 108 is inclined from front to rear of the machine so that if nuts do not drop immediately when a row of fingers 44 reaches the upper foremost position shown in FIGURE 3, there is ample opportunity for the nuts to pass through the perforations 110 either directly into the box 100 or upon either the forward nut guide 102 or the rear nut guide 104.

If it is desired to make the machine into a "ride-on" type, a seat for the operator can be provided in the region of the handle bar 98, as shown in FIGURE 1A. In this case, the forward wheels 86 may be dispensed with and a similar rig may be placed at or about the seat location and may be similarly adjusted as to height. This actually would have some advantage since, when the wheels 86 lead the machine, they may press a substantial number of nuts so firmly into the ground as not to be dislodged by the fingers 44 and hooks 46.

It is to be noted that the position of the machine as a whole is governed by a two-point supporting means, that is, the wheels 86, whether fore or aft, and the rollers 92 and, of course, differences in contour of the terrain may produce variations in the spacing of the machine as a whole above the ground in its active portion. Such variations are well cared for by the slack deliberately created in the lower pass of the chains 36.

While certain specific details have been illustrated and described in order to arrive at this disclosure, numerous variations in structural details will occur to one skilled in the art. It is not intended, therefore, to limit this invention to the precise details disclosed, but only as set forth in the subjoined claims.

What is claimed is:

1. A nut gathering machine comprising: a frame adapted to be advanced over the ground; parallel endless conveyor means at each side of said frame; cross members connecting said conveyor means; spaced outwardly directed fingers rigidly affixed to said cross members; hooks at the free ends of said fingers, said cross members being spaced apart a distance greater than the lateral extent of said hooks; a nut receiving container supported by said frame and lying within the loops of said conveyor means and means to advance the lower pass of said conveyor means in the same direction relative to the frame as the advance of said frame relative to the ground.

2. A machine as set forth in claim 1, including a plate secured to said frame adjacent to and below the upper pass of said conveyor means, said plate having a pattern of nut passing openings therethrough.

3. A machine as set forth in claim 1, including fixed nut guides extending transverse of said frame and extending from the upper pass of said conveyor means into said nut receiving container.

4. A machine as set forth in claim 1, including substantial slack in the lower pass of said conveyor means whereby to accommodate varying ground contours.

5. A machine as set forth in claim 4, including a plate secured to said frame adjacent to and below the upper pass of said conveyor means, said plate having a pattern of nut passing openings therethrough.

6. A machine as set forth in claim 4, including fixed nut guides extending transverse said frame and extending from the upper pass of said conveyor means into said nut receiving container.

References Cited

UNITED STATES PATENTS

| | | | |
|---|---|---|---|
| 3,101,581 | 8/1963 | Kelso et al. | 56—28 |
| 1,256,390 | 2/1918 | Stuart | 56—328 XR |
| 1,190,457 | 7/1916 | Pridgen | 56—130 |
| 1,644,366 | 10/1927 | Brown | 56—328 |
| 2,482,383 | 9/1949 | Traverso | 56—328 |
| 2,694,284 | 11/1954 | Kortz | 56—328 |
| 2,718,745 | 9/1955 | Scafidi | 56—328 |

RUSSELL R. KINSEY, Primary Examiner

U.S. Cl. X.R.

56—28